UNITED STATES PATENT OFFICE.

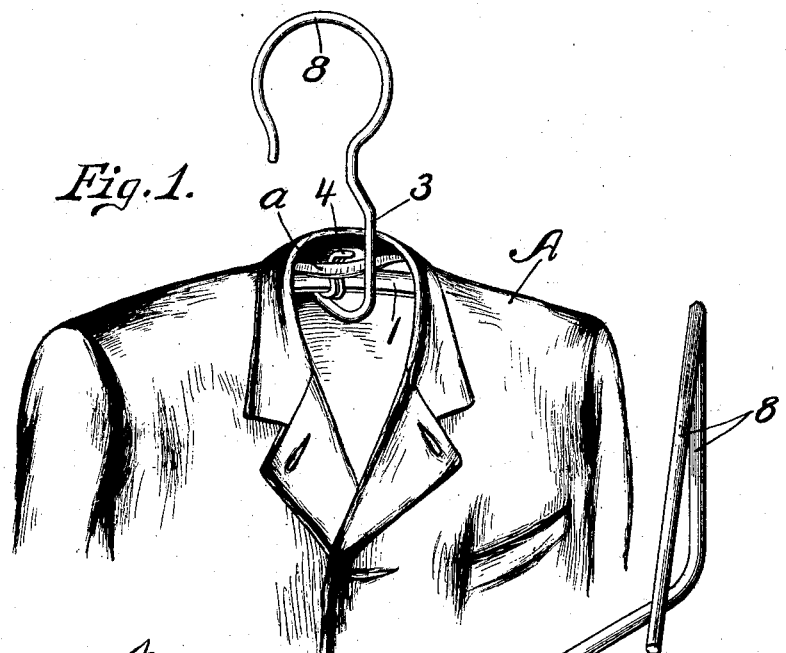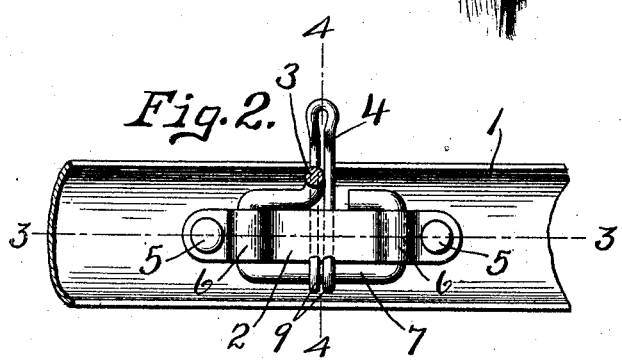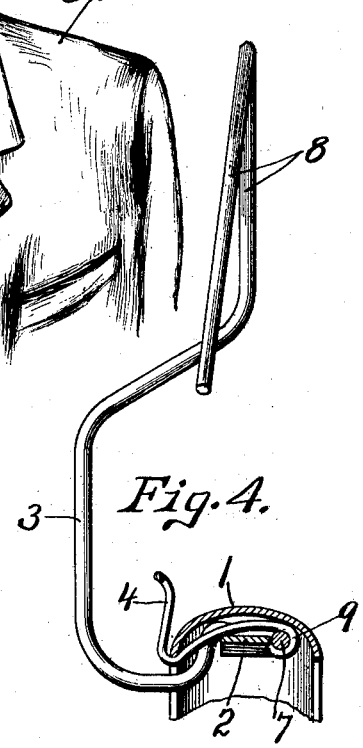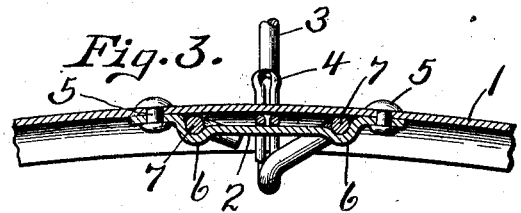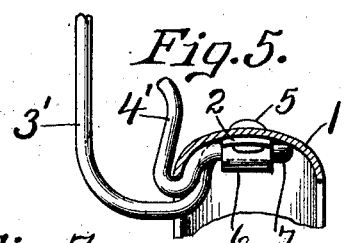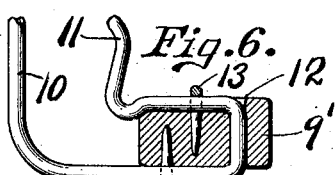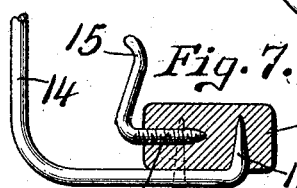

HERMAN FREDERICK UNGERER AND JOHN R. VAN TASSEL, OF GENEVA, NEW YORK.

COAT-HANGER.

983,464. Specification of Letters Patent. Patented Feb. 7, 1911.

Application filed April 13, 1909. Serial No. 489,634.

*To all whom it may concern:*

Be it known that we, HERMAN F. UNGERER and JOHN R. VAN TASSEL, of Geneva, in the county of Ontario, in the State of New York, have invented new and useful Improvements in Coat-Hangers, of which the following, taken in connection with the accompanying drawings, is a full, clear, and exact description.

This invention relates to certain improvements in coat hangers comprising a curved bar or form having a laterally offset upwardly extended hook adapted to be engaged with another hook or other wall support for suspending the form and garment thereon.

We have observed that after a coat (and particularly a heavy one) is supported upon a form for a short time, the central portion of the back or collar is drawn downwardly at the rear side of the supporting bar, thereby more or less deforming this portion of the coat by reason of the fact that it is supported solely by the shoulders.

The object of our present invention is to provide the form with an auxiliary hook with which the strap on the inside of the collar may be engaged to hold the collar and adjacent portion of the coat closely upon the form and prevent its sagging down at the back, thereby avoiding the deformation previously mentioned.

Other objects and uses relating to specific parts of the form will be brought out in the following description.

In the drawing—Figure 1 is a perspective view of our improved coat hanger showing a portion of the coat as mounted thereon. Fig. 2 is an enlarged inverted plan of the central portion of the bar showing particularly the manner of fastening the auxiliary hook, the main hook being shown in section. Figs. 3 and 4 are sectional views taken on lines 3—3 and 4—4, Fig. 2. Fig. 5 is a sectional view similar to Fig. 4 of a modified construction in which the auxiliary hook is formed integral with the main hook. Fig. 6 is a sectional view of a further modified form of hanger similar to Fig. 5 except that the main bar is formed of wood. Fig. 7 is a sectional view similar to Fig. 6 in which the auxiliary hook is separate from the main hook.

The coat hanger shown in Figs. 1, 2, 3 and 4 comprises a metal frame or bar —1— which is curved longitudinally and transversely, as clearly shown in Figs. 3 and 4, with its convex surface uppermost. Secured to the central portion of the under side of this bar —1— is a clamping plate —2— for retaining one end of the main hook —3— and an auxiliary hook —4—. This clamping plate is held in place by rivets —5— and is provided with looped or grooved portions —6— forming seats for the base of the main hook —3—. This base of the main hook is bent laterally into the form of a rectangular loop —7— having opposite ends thereof seated in the loops —6— between the clamping plate —2— and under side of the main bar —1— to hold the hook against movement relatively to the main supporting bar. The intermediate portion of the hook —3— is extended from the base —6— laterally some distance beyond one of the longitudinal edges of the bar —1—, as best seen in Fig. 4, and is then extended upwardly and returned laterally directly over, but some distance above, the bar —1—, where it terminates in a return bend or hook —8— adapted to be interlocked with a suitable wall support not shown. The auxiliary hook —4— preferably consists of a single piece of wire returned upon itself forming a double wire having one end passed between the clamping plate —2— and inner side of the bar —1— and provided with an eye —9— which is looped around and attached to one side of the base —7— of the main hook —3—, the opposite end of said auxiliary hook being extended laterally beyond the same side of the bar —1— at which the hook —3— is located, and is extended upwardly some distance above the bar —1—, the upper extremity terminating in a lateral offset for receiving and retaining the collar strap, as —*a*—, of a coat —A—. The main hook —3— and auxiliary hook —4— are, therefore, located at the same side of the bar —1— and are both secured in place by the same fastening means, as, for example, clamping plate —2—, and both hooks extended above the plane of the bar —1— so that when the coat is hung upon said bar the strap —*a*— may be readily engaged with the auxiliary hook —4— to retain the collar and center of the back portion of the coat against sagging.

In Fig. 5 is shown the same supporting bar —1— and clamping plate —2— but a modified form of main hook —3′— and auxiliary hook —4′—, the latter forming one end of the base of the main hook —3'—, and is, therefore, integral with said main hook and held in place by the clamping plate —2—. This auxiliary hook —4'— is formed by simply extending the terminal end of the base —7—, Fig. 2, laterally in the same direction as the main body of the hook and then upwardly at the adjacent side of the bar —1—.

In Fig. 6 we have shown a wood bar —9'—, main hook —10— and auxiliary hook —11—, the latter forming the terminal end of the main hook —10—. It will be seen upon reference to Fig. 6 that one end of the main hook —10— is passed through an aperture —12— in the wood bar —9'— and is then returned over the top face of the bar and extended upwardly some distance above said bar and at the same side as the main hook —10—, the hooks being additionally held in place by staples —13—, as best seen in Fig. 6.

In Fig. 7 we have shown a wood bar —9'— similar to that shown in Fig. 6, to which is secured a main hook —14— and an auxiliary hook —15—, the latter having a screw threaded portion —16— which is screwed into the wood body —9'—. One end of the main hook —14— is provided with a spur —17— which is driven into the wood and held in operative position by a staple —18—.

The operation of our invention will be readily understood by reference to the foregoing description and accompanying drawing, and it is clear that the main object of our invention is to provide the bar with an auxiliary hook associated with the main hook by which the bar is suspended.

What we claim is—

1. A coat hanger comprising a bowed portion adapted to support the shoulders of a coat, and having a centrally disposed hook secured thereto, the base of said hook being provided with an upwardly projecting part which projects above the top of the said bowed portion to which said hook is attached.

2. A coat hanger comprising a part adapted to support the shoulders of a coat, and a hook comprising an upper and a lower hook, said lower hook passing under said part and being secured thereto and being formed with an upward projection which is adapted for engagement with the loop hanger of the coat.

In witness whereof we have hereunto set our hands this tenth day of April, 1909.

HERMAN FREDERICK UNGERER.
JOHN R. VAN TASSEL

Witnesses:
WM. M. FINK,
CHAS. v. R. JOHNSTON.